United States Patent [19]

Faeser et al.

[11] Patent Number: 4,916,440
[45] Date of Patent: Apr. 10, 1990

[54] DEVICE FOR INPUTTING NUMERICAL OR ALPHANUMERICAL DATA, RESPECTIVELY INTO AN APPARATUS

[75] Inventors: Ulrich Faeser, Kronberg; Hans-Dietrich Polaschegg, Oberursel; Dieter Mahn, Bad Homburg, all of Fed. Rep. of Germany

[73] Assignee: Fresenius AG, Fed. Rep. of Germany

[21] Appl. No.: 224,094

[22] Filed: Jul. 26, 1988

[51] Int. Cl.4 ............................................. G09G 1/00
[52] U.S. Cl. ..................................... 340/706; 340/709
[58] Field of Search ............... 340/706, 912, 709, 710; 178/18, 19; 273/148 B; 341/20

[56] References Cited

U.S. PATENT DOCUMENTS

| | | | |
|---|---|---|---|
| 4,293,734 | 10/1981 | Pepper, Jr. | 178/18 |
| 4,437,008 | 3/1984 | Matsuda et al. | 340/709 |
| 4,550,316 | 10/1985 | Whetsone et al. | 340/709 |
| 4,552,360 | 11/1985 | Bromley et al. | 340/709 |
| 4,563,740 | 1/1986 | Blake et al. | 340/709 |
| 4,581,483 | 4/1986 | Ralston | 340/709 |
| 4,647,915 | 3/1987 | Shank et al. | 340/709 |
| 4,685,678– | 8/1987 | Frederiksen | 340/709 |
| 4,928,944 | 3/1988 | Tamaru et al. | 178/18 |

FOREIGN PATENT DOCUMENTS 3404047 8/1985 Fed. Rep. of Germany .

OTHER PUBLICATIONS

*IBM Technical Disclosure Bulletin*, vol. 23, No. 8, Jan. 1981, pp. 3831–3834, "Keyboard Scanned Capacitive Joy Stick Cursor Control", J. E. Fox.
*IBM Technical Disclosure Bulletin*, vol. 28, No. 8, Jan. 1986, pp. 3309–3311, "Variable Trigger—Control for a Digital Man—Machine Interface".

*Primary Examiner*—David K. Moore
*Assistant Examiner*—Yar M. Fatahi
*Attorney, Agent, or Firm*—Townsend and Townsend

[57] ABSTRACT

The tapped voltage representing the displacement and duration of a potentiometer in a joystick-type actuating element is applied to an analog to digital converter and the converted digital value is fed to preset inputs of a presettable digital counter which is set at its counting inputs by a clock generator. The overflow output of the presettable counter is connected to a load input of the presettable counter and to an up/down counter which controls a display or the like via decoding and driver circuits. A subtracting circuit is provided to subtract a preselected value from the converted digital value in order to provide a dead zone for a preselected range of the potentiometer.

8 Claims, 2 Drawing Sheets

DEVICE FOR INPUTTING NUMERICAL OR ALPHANUMERICAL DATA, RESPECTIVELY INTO AN APPARATUS

BACKGROUND OF THE INVENTION

The present invention relates to a device for inputting alphanumeric data into medical electromechanical apparatus. A German published patent application DE-OS 3404047, entitled "Video Game VDU Cursor Control Scale Change".

If such a device is for instance used for inputting numerical or alphanumerical data, respectively into medical electromechanical apparatuses then it is known to change the inputted data as a function of the deflection of an actuating element or as a function of the duration of the actuation of the element, respectively.

The displacement-actuation-relationship at the first alternative is an optimum from an anthropotechnical view since the user of the device senses automatically the amount of reaction, this means the amplitude of the inputted value as a result of his action expenditure.

Merely at large values of the input difference which, nevertheless, is to be inputted precisely the anthropotechnical optimum is lost due to the actuation expenditure. If, on the other hand, large displacements of actuating elements are related to large differences of the input amounts by an according design of the device then an exact input is not further possible.

With the second alternative a quasi-steady function between the action of the user and the reaction of the apparatus results and over large ranges of numbers the input expenditure is comparable to that of the steady input devices.

Finally, numerical input devices are known which have a non-steady behaviour as for instance code switches at which for each decimal number and therefore per decade a switching element is provided. Herewith a steady function between the user action and the amount of the newly inputted difference is not further given so that erroneous inputs may appear in a much larger extend than with steady justable input elements, this means a weak point from an anthropotechnical point of view. On the other hand, the actuation expenditure is nearly independent from the amount of the input difference without any loss of exactitude.

The above-mentioned known device relates to a cursor control with a joystick, the deflection of which is sensed by resistive elements in order to provide the amount and direction of the cursor displacement. In order to achieve this the tapped voltage signals after analog/digital-conversion are applied to a microprocessor for further processing.

SUMMARY OF THE INVENTION

According to the invention, the tapped voltage representing the displacement and duration of a potentiometer in a joystick-type actuating element is applied to an analog-to-digital converter and the converted digital value is fed to preset inputs of a presettable digital counter which is set at its counting inputs by a clock generator.

The overflow output of the presettable counter is connected to a load input of the presettable counter and to an up/down counter which controls a display or the like via decoding and driver circuits. A subtracting circuit is provided to subtract a preselected value from the converted digital value in order to provide a dead zone for a preselected range of the potentiometer.

The device according to the invention allows a substantial reduction of the input procedure also at large input differences dN by providing circuit means which make the display and therefore the reaction of the apparatus $R_A$ dependent from the position dP of the input element as well as from the actuation time dT of the input element, this means the circuit means according to the invention implements the following relationship:

$$dN = f[R_A(dP), dT]$$

In this equation dN corresponds to the difference between the actual input value and the preceeding input value. $R_A$ describes a reaction of the apparatus and is a function of the position difference dP and dT corresponds to the actuation time.

An input device implementing this relationship combines the behaviour of the steady displacable input element with the behaviour of the quasi-steady input element whereat the constant of the apparatus is replaced by the variable reaction of the apparatus.

From the input action of the user two parameters are derived, namely the parameter of the position difference and of the actuation time. Herewith, the difference between the preceding input value and the actual input value changes with the velocity $R_A$ as long as the input element is actuated whereat $R_A$ is a steady and positive function of the position difference of the input device.

The present invention basically can be implemented with digital and analog circuit means. Preferably, a dead-zone is provided within which the input device does not react upon small deflections of the actuating element.

At the analog implementation, preferably a potentiometer tap is connected to a voltage/frequency-converter.

At the digital implementation the tapped voltage after analog/digital-conversion controls the preset inputs of a presettable counter.

At both embodiments a potentiometer resistor is operated between different voltages. The tap of the potentiometer is based in his centre position by one or a plurality of springs, respectively so that in a starting position a voltage of zero volt is tapped by the potentiometer. The dead-zone may be implemented at the analog implementation by a diode network whereas at the digital implementation the dead-zone is achieved by a subtraction of a small digital number from the digital number outputted by the anolog/digital converter.

BRIEF DESCRIPTION OF THE DRAWINGS

With respect to the figures shown in the attached drawing embodiments of the input device according to the invention shall be further described in the following. It shows.

DESCRIPTION OF SPECIFIC EMBODIMENTS

Figure 1:
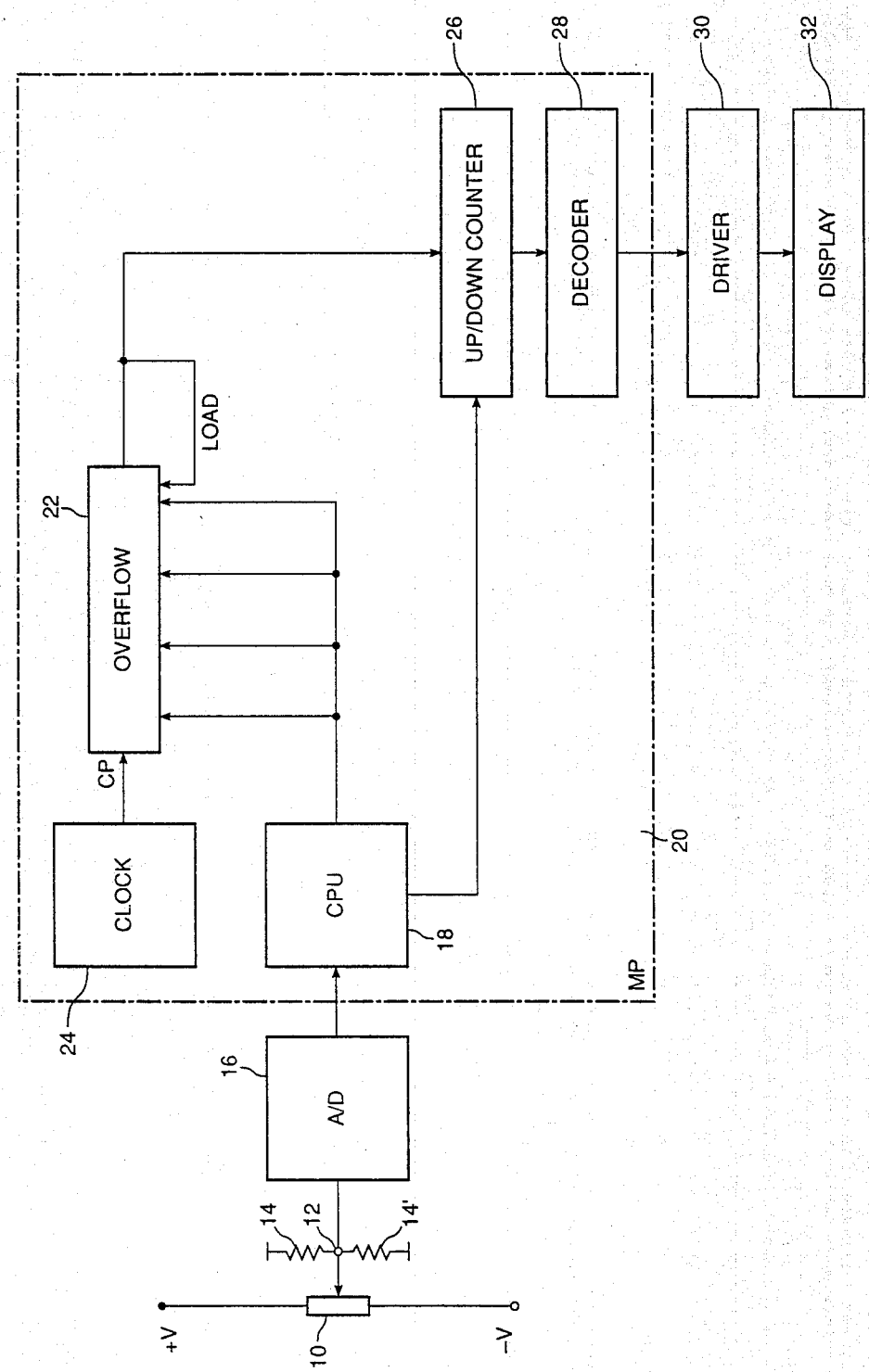
FIG. 1 an input device operating essentially in a digital manner.

According to FIG. 1 a potentiometer resistor 10 is operated between positive and negative voltages $+V$ and $-V$ having the same value. The tap 12 of the potentiometer resistor 10 is biased in his middle position by means of springs 14, 14' so that at a connection of the tap 12 with a not-shown rotary knob this knob returns to its starting position if it is released. The schematically shown springs 14, 14' also can be replaced for instance by a single spring clip.

The voltage tapped from the potentiometer 10, 12 is fed to an analog/digital converter 16 which converts the tapped voltage into a digital value having a width of a plurality of bits. This digital value is provided with a sign as a function of the deflection direction of the potentiometer tap 12 and is fed to a subtracting circuit 18 which subtracts from the digital value a small digital value in order to provide a dead zone within which at a small deflection of the potentiometer 12 no variation of the digital display is effected. The subtracting circuit 18 herewith may be implemented by the central processing unit CPU of a microprocessor 20 which in a common but non-shown manner is provided with a random-access memory RAM and a program read-only memory ROM.

A digital value which is treated in the above-indicated manner is fed to the preset inputs of a presettable counter 22 which at its clock input CP is fed by the clock pulses of a clock generator 24. As a function of its presetting the counter 22 overflows more or less quickly whereat each overflow pulse at one hand is used for newly presetting the counter 22 with the digital value as calculated by the subtracting circuit 18 and on the other hand is used to drive the counting input of an up/down-counter 26. The counting direction of the up/down-counter 26 is determined by the subtracting circuit 18 as a function of the fact whether a positive or negative digital value, respectively is present. The up/down-counter 26 controls via decoder circuits 28 and driver circuits 30 a display 32.

The subtracting circuit 18 this means the central processing unit CPU, the presettable counter 22, the clock generator 24, the up/down-counter 26 and the decoding circuits 28 are implemented within a common available microprocessor 20.

It may be taken that beginning with a certain displacement of the potentiometer a display 32 is more or less quickly changing whereat this changing depends from the deflecting of the potentiometer and from the duration of the deflection.

Figure 2:
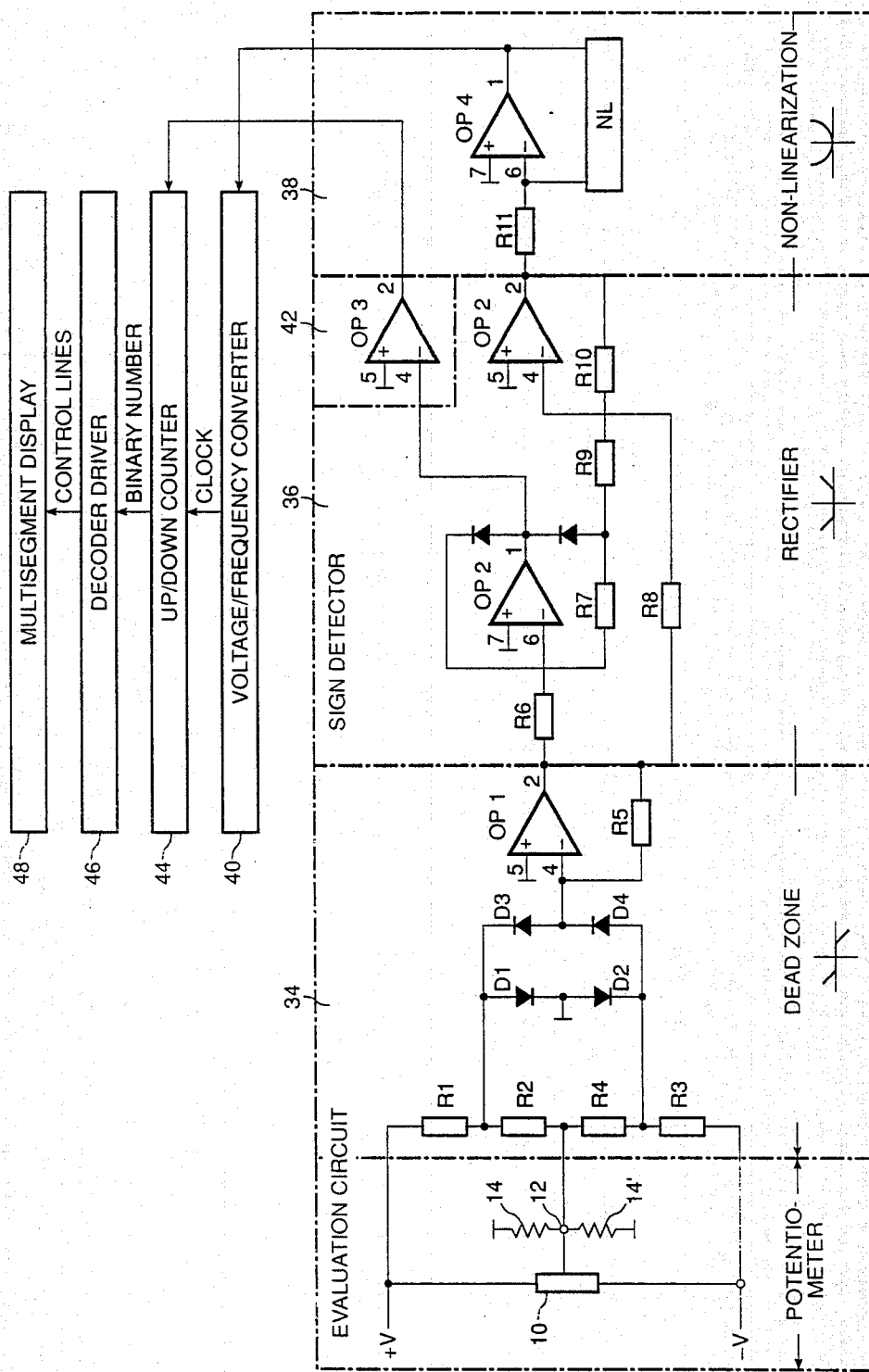
FIG. 2 an input device operating essentially in an analog manner.

According to FIG. 2 again a potentiometer resistor 10 is arranged between positive and negative voltages +V and −V having the same value. The tap 12 of the potentiometer resistor 10 in the same manner is biased in its middle position by springs 14, 14' so that also at this implementation when the tap 12 is connected to a not shown rotary knob this knob is returned to its starting position if it is released.

A dead-zone unit 34 which comprises a diode bridge circuit connected to a voltage divider and an operational amplifier whereat the voltage tapped from the voltage divider is influenced by the position of the potentiometer 10, 12 provides a dead zone within which changes of the potentiometer position are without any influence. Starting with a certain displacement of the potentiometer tap 12 the voltage at the output of the dead zone unit increases or decreases, respectively in a linear manner. The negative slope of the tap voltage is rectified by a rectifier 36 and is superposed to the positive slope. The composed voltage normally is fed directly to a voltage/frequency converter VCO-40. Optionally, a non-linear unit 38 may be provided between the rectifier 36 and the voltage/frequency converter 40 in order to give a non-linear behaviour to the input voltage applied to the voltage/frequency converter 40.

The unit 42 evaluating the sign of the tapped voltage is connected between the dead zone unit 34 and an up/down counter 44 to provide the counting direction for said counter as a function of the sign. The input of the counter 44 is fed by the voltage/frequency converter VCO-40. The up/down counter 44 controls via decoder/driver circuits 46 the display 48.

The dead zone unit 34, the rectifier 36, the unit 42 implementing the sign function and the non-linear function unit 38 each may be implemented by operational amplifiers and according circuit components as it is known for a man skilled in the art. Furtheron, it is recommended to provide between the potentiometer tap and the dead zone unit 34 a 1:1 operational amplifier for decoupling.

It may be taken also in this case that starting with a certain displacement of the potentiometer a display 48 is changed more or less quickly whereat this change depends from the deflection of the potentiometer and from the duration of this deflection.

The handling of the input device according to the invention is very simple. The farer the user of the input element displaces the potentometer from its middle position the quickler the intented set value is achieved. If the actual value approaches the intented set value then the user may reduce the deflection from the middle position and therefore also may reduce the changing velocity of the actual value until a smooth approach of the intented set value is achieved. A possible overshot of the intented set value may be corrected by an opposed deflection of the input element from the middle position. The effect of the input device is comparable to an accelerator pedal of a motor vehicle. Even large differences between the preceding input value and the intented input value are shortly bridged by a maximum deflection of the input element and in the end phase of the input procedure there exists a possibility to set the indented value precisely.

We claim:

1. Device for inputting alphanumeric data into an apparatus, in particular into medical electromechanical apparatuses comprising circuit means for changing inputted data as a function of the value and the direction of the displacement of a resistive input element having a tap with said tap being connected to an analog/digital converter and a digital circuit connected to said converter, said circuit means comprising
   (a) a presettable counter (22) having connected its presetting inputs to the output of said analog/digital converter (16) via a subtracting circuit (18), its counting input to a clock generator (24) and its overflow output to a load input of said presettable counter (22); and
   (b) an up/down counter (26) being connected to the overflow output of said presettable counter (22) and controlling via decoding and driver circuits (28, 30) a display (32).

2. Device for inputting alphanumeric data into an apparatus in particular into medical electromechanical apparatuses, comprising circuit means for changing inputted data as a function of the value and the direction of the displacement of a resistive input element having a tap, wherein
   (a) the tap (12) is connected via a dead zone member (34) and a rectifier (36) to a voltage/frequency converter (VCO-40); and (b) the voltage/frequency converter (VCO-40) is coupled to an up/down counter (44) which controls via decoding and driver circuits (46) a display (48).

3. Device according to claim 1, characterized in that said subtracting circuit (CPU-18) serves to subtract from each converted digital value a predetermined digital value in order to provide a dead zone in which the displacement of the resistive input element results in no change of the display.

4. Device according to claim 2, characterized by means (42) for evaluating the sign of the tapped voltage with the output of said means being connected to a direction input of said up/down counter (44).

5. Device according to claim 4, characterized by means (38) arranged between the rectifier (36) and the voltage/frequency converter (VCO-40) for providing a non-linear behaviour of the tapped and rectified voltage.

6. Device according to claim 3, characterized in that the subtracting circuit (CPU-18) further provides a sign signal to direction input of said up/down counter (26).

7. Device according to claim 3, wherein the presettable counter (22), the clock generator (24), the analog/digital counter (16), the up/down counter (26) and the subtracting circuit (CPU-18) are integrated in a microprocessor (20).

8. Device according to claim 5, characterized by accordingly wired-up operational amplifiers for implementing the rectifying function, the sign function and the non-linear function.

* * * * *